(12) United States Patent
Deschenes et al.

(10) Patent No.: US 11,212,899 B1
(45) Date of Patent: Dec. 28, 2021

(54) ENHANCING DALI-BASED LIGHTING CONTROL

(71) Applicant: IDEAL Industries Lighting LLC, Durham, NC (US)

(72) Inventors: Pierre Deschenes, Muskego, WI (US); Michael B. Gilliom, Raleigh, NC (US); Steven H. Pilgrim, II, Gurnee, IL (US)

(73) Assignee: IDEAL Industries Lighting LLC, Racine, WI (US)

( * ) Notice: Subject to any disclaimer, the term of this patent is extended or adjusted under 35 U.S.C. 154(b) by 0 days.

(21) Appl. No.: 16/915,418

(22) Filed: Jun. 29, 2020

(51) Int. Cl.
*H05B 47/18* (2020.01)
*H05B 45/10* (2020.01)
*H05B 45/30* (2020.01)
*H04L 29/08* (2006.01)

(52) U.S. Cl.
CPC ............ *H05B 47/18* (2020.01); *H04L 67/12* (2013.01); *H05B 45/10* (2020.01); *H05B 45/30* (2020.01)

(58) Field of Classification Search
None
See application file for complete search history.

(56) References Cited

U.S. PATENT DOCUMENTS

| | | | | |
|---|---|---|---|---|
| 8,035,320 | B2* | 10/2011 | Sibert | H05B 47/12 315/312 |
| 2014/0070706 | A1* | 3/2014 | Fushimi | H05B 47/19 315/131 |
| 2016/0085884 | A1* | 3/2016 | Schafer | G06Q 30/0611 703/1 |
| 2017/0094753 | A1* | 3/2017 | Lunn | H05B 47/18 |
| 2017/0105265 | A1* | 4/2017 | Sadwick | F21K 9/232 |

* cited by examiner

*Primary Examiner* — Crystal L Hammond
(74) *Attorney, Agent, or Firm* — Withrow & Terranova, P.L.L.C.

(57) ABSTRACT

A Digital Addressable Lighting Interface (DALI) control hub implements DALI-based lighting control. The DALI control hub receives, from a DALI controller, a DALI control message addressed to the DALI control hub. The DALI control hub controls a plurality of DALI compliant devices collectively in accordance with the DALI control message. To control the plurality of DALI compliant devices collectively, the DALI control hub transmits, to each of a plurality of DALI compliant devices, a further DALI control message addressed to the DALI compliant device based on the DALI control message received from the DALI controller.

22 Claims, 9 Drawing Sheets

| 90 LUMEN STEP | 25 LUMEN STEP | 10 LUMEN STEP | FIXTURE |
|---|---|---|---|
| DOWN | DOWN | DOWN | -125 |
| DOWN | DOWN | NO CHG | -115 |
| DOWN | DOWN | UP | -105 |
| DOWN | NO CHG | DOWN | -100 |
| DOWN | NO CHG | NO CHG | -90 |
| DOWN | NO CHG | UP | -80 |
| DOWN | UP | DOWN | -75 |
| DOWN | UP | NO CHG | -65 |
| DOWN | UP | UP | -55 |
| NO CHG | DOWN | DOWN | -35 |
| NO CHG | DOWN | NO CHG | -25 |
| NO CHG | DOWN | UP | -15 |
| NO CHG | NO CHG | DOWN | -10 |
| NO CHG | NO CHG | NO CHG | 0 |
| NO CHG | NO CHG | UP | 10 |
| NO CHG | UP | DOWN | 15 |
| NO CHG | UP | NO CHG | 25 |
| NO CHG | UP | UP | 35 |
| UP | DOWN | DOWN | 55 |
| UP | DOWN | NO CHG | 65 |
| UP | DOWN | UP | 75 |
| UP | NO CHG | DOWN | 80 |
| UP | NO CHG | NO CHG | 90 |
| UP | NO CHG | UP | 100 |
| UP | UP | DOWN | 105 |
| UP | UP | NO CHG | 115 |
| UP | UP | UP | 125 |

FIG. 5

ENHANCING DALI-BASED LIGHTING CONTROL

BACKGROUND

Digital Addressable Lighting Interface (DALI) is a protocol for digital lighting control originally developed as a replacement for simple analog control, such as 0-10V (or 1-10V) analog lighting control. These previous analog controls involved varying a signal of up to 10V to correspondingly control the output power of one or more controlled lighting devices.

The latest version of DALI (i.e., DALI-2) is now an International Electrotechnical Commission (IEC) standard specified in IEC 62386. Using DALI, messages can be exchanged between a DALI controller and one or more input devices via a simple pair of wires that act as a bus for carrying both power and data.

BRIEF SUMMARY

Although DALI allows a controller to communicate with one or more devices on a DALI bus, modern lighting devices can be relatively more complex than DALI was designed to effectively consider. For example, as fixture power grows, many fixtures are designed with multiple drivers that regulate power to groups of Light Emitting Diodes (LEDs) that work together to provide illumination. From the perspective of a device external to the fixture, the fixture should be considered to be a single device. However, in reality, the fixture may be a more complex collection of integrated or interworking components that need to coordinate in their operation.

Accordingly, some examples of the present disclosure generally enable a DALI controller to interoperate with a wider variety of lighting environments and fixtures. In particular, some examples of the present disclosure enable a DALI controller to treat a plurality of DALI compliant devices as though it were a single DALI device. To do so, particular examples include a DALI control hub that interacts with the DALI controller, and coordinates appropriate corresponding interaction with the DALI compliant devices in the fixture.

Particular examples include a DALI control hub that receives, from a DALI controller, a DALI control message addressed to the DALI control hub. The DALI control hub also controls a plurality of DALI complaint devices collectively in accordance with the DALI control message. To control the plurality of DALI compliant devices collectively, the DALI control hub transmits, to each of a plurality of DALI compliant devices, a further DALI control message addressed to the DALI compliant device based on the DALI control message received from the DALI controller.

Of course, the present examples are not limited to the above contexts or examples, and additional features and advantages will become apparent in view of the following detailed description and in view of the accompanying drawings.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more examples, whereas discussion of a specific instance of an illustrated element will append a letter designation thereto (e.g., discussion of a DALI compliant device 120, generally, as opposed to discussion of particular instances of DALI compliant devices 120a, 120b).

FIG. 5 is a table illustrating an example of sending different combinations of DALI illumination stepping commands to respective DALI compliant devices, according to one or more examples of the present disclosure.

DETAILED DESCRIPTION

Figure 1:
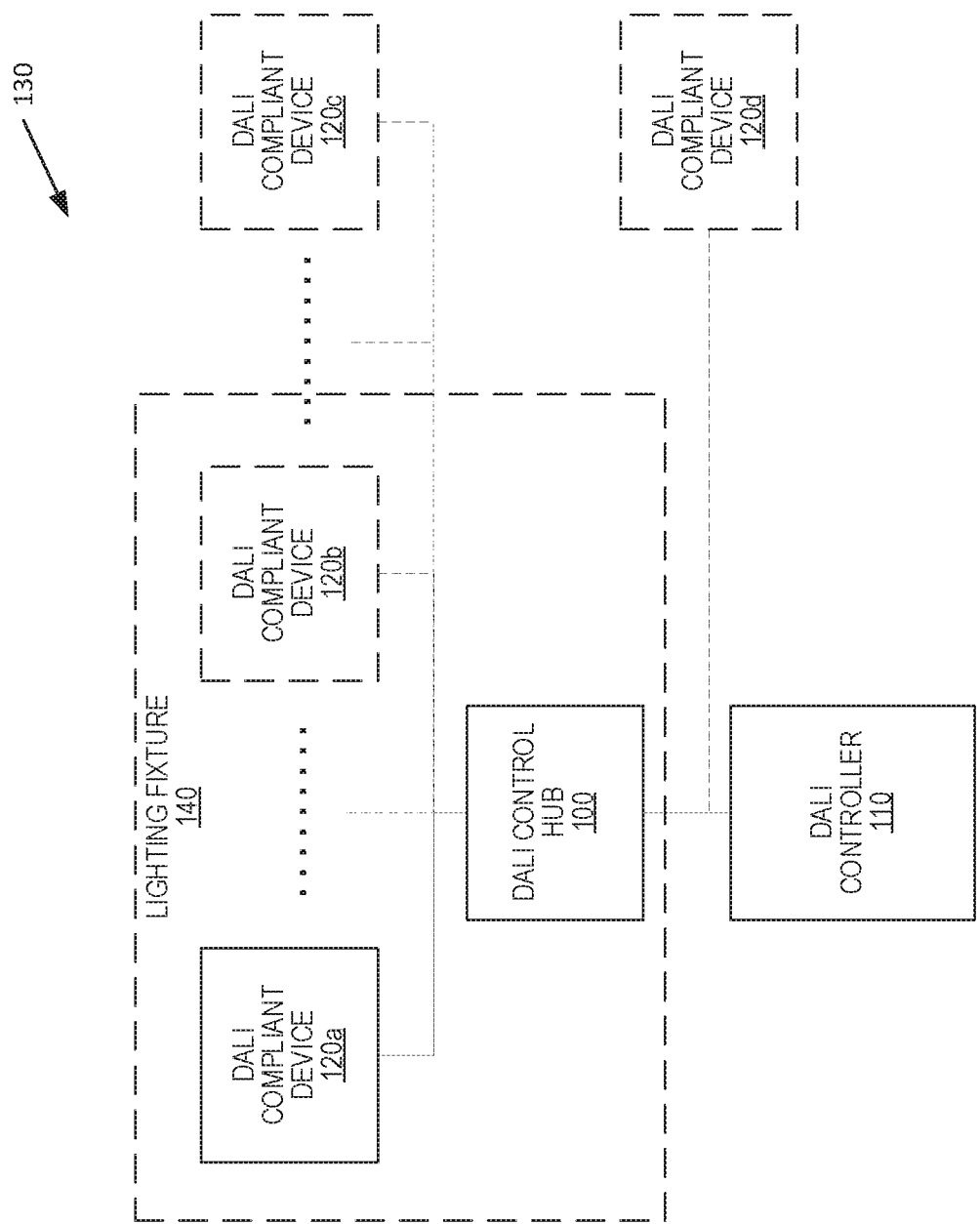
FIG. 1 is a schematic block diagram illustrating an example of a DALI network 130 according to one or more examples of the present disclosure.

The examples set forth below represent the necessary information to enable those skilled in the art to practice the examples and illustrate the best mode of practicing the examples. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular examples only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Traditionally, the DALI communication protocol allows a central or single controller to communicate with a DALI compliant device (e.g., an LED driver) in order to control certain features and/or receive parametric information therefrom. When a lighting solution being managed by a DALI controller, simple, direct command/response between the DALI controller and the DALI compliant device as performed using traditional DALI techniques may often be adequate.

Modern lighting solutions are not always that simple, however. In particular, a lighting solution may include numerous individual DALI compliant devices that operate in a coordinated fashion in order to achieve a particular desired result. For example, a relatively high-powered lighting fixture may not be feasible or practical to implement using a single LED driver. Indeed, multiple drivers may be necessary or appropriate in order to produce a particular number of desired lumens.

Traditional DALI-based approaches to managing a multi-driver lighting fixture would require each LED driver in the lighting fixture to obtain its own DALI address. Correspondingly, the DALI controller would have to know these different addresses in order to communicate with each respective driver.

Many DALI controllers are simply not up to the task of managing a more complex lighting solution of this type. For example, the DALI controller may not be capable of coordinating a shared bus for multiple DALI compliant devices. Additionally or alternatively, the DALI controller may not be capable of performing the tasks necessary for commissioning a lighting solution. For example, the DALI controller may not be able to produces, store, and/or track the addresses of the DALI compliant devices. Moreover, there may not be an appropriate selection of predefined bus addresses that will work for all applications. Further, even if a lighting solution (e.g., a lighting fixture) were capable of having all of its DALI compliant devices programmed with appropriate DALI addresses during manufacturing, doing so may be prohibitively expensive, introduce needless manufacturing delays, or be otherwise impractical.

Further still, even if the DALI controller were able to coordinate with the multiple endpoints within such a light fixture (and many are not), a DALI controller that is ignorant of the particular details of the lighting solution may undermine the efficacy thereof. Indeed, treatment of the individual DALI compliant devices within a complex lighting fixture as independent entities rather than parts of a greater whole may not be appropriate or adequate for operating the lighting fixture as expected or advertised.

Accordingly, among other things, examples of the present disclosure include a DALI control hub that mitigates or avoids at least one of the problems discussed above with respect to traditional DALI-based lighting control techniques. Such examples may, for example, enable a traditional DALI controller to interoperate with a wider variety of lighting environments and fixtures. Additionally or alternatively, such examples may enable a DALI controller to treat a plurality of DALI compliant devices as though it were a single DALI device, e.g., by insulating the DALI controller from particular details regarding the underlying DALI architecture within a given lighting solution. To do so, the DALI control hub may, for example, interact with the DALI controller, and coordinate appropriate corresponding interaction with a plurality of DALI compliant devices.

FIG. 1 is a schematic block diagram illustrating a basic example of a DALI network 130 according to one or more examples of the present disclosure. The DALI network includes a DALI controller 110, a DALI control hub 100, and a DALI compliant device 120a. The DALI control hub 100 is communicatively connected to both the DALI controller 110 and the DALI compliant device 120a via respective DALI buses. Examples of a DALI compliant device 120 include, but are not limited to, an LED driver, a dimmer, an electronic ballast such as a fluorescent lighting ballast, an occupancy sensor, a light sensor, a push-button, and/or a slider.

The DALI controller 110 and DALI control hub 100 communicate with each other using the DALI protocol. The DALI control hub 100 and the DALI compliant device 120a also communicate with each other using the DALI protocol. In this example, the DALI controller 110 and the DALI compliant device 120a are on separate buses, and therefore cannot communicate with each other directly. That said, other examples additionally or alternatively include a DALI compliant device 120d on the same bus as the DALI controller 110.

In some examples, some or all of the DALI network 130 is included within a lighting fixture 140. In the example shown in FIG. 1, the lighting fixture 140 includes the DALI compliant device 120a and the DALI control hub 100, and the DALI controller 110 is separate, discrete of external to the lighting fixture 140. For example, the DALI compliant device 120a may be an LED driver configured to regulate power to a plurality of LEDs of the light fixture 140. In a different example, the DALI compliant device 120a is included in the lighting fixture 140, and the DALI controller 110 and DALI control hub 100 are external to the lighting fixture 140. In some such examples, the DALI control hub 100 may, in some examples, be mounted on, near, and/or proximate to the lighting fixture 140.

Although FIG. 1 illustrates a lighting fixture 140 as an example in which a DALI control hub 100 communicates with both a DALI compliant device 120 and a DALI controller 110, according to other examples of the present disclosure, the DALI network 130 may be included in other types of lighting solutions, either in whole or in part.

In some examples, two or more DALI compliant devices 120 may share a DALI bus to communicate with the DALI control hub 100. For example, as shown in FIG. 1, DALI compliant devices 120a, 120b are included in lighting fixture 140 and communicate with the DALI control hub 100 via the same DALI bus. DALI compliant device 120c is outside of the lighting fixture 140, and is connected to the same DALI bus as each of the DALI compliant devices 120a, 120b in the lighting fixture 140. In contrast to DALI compliant devices 120a-c, DALI compliant device 120d is on the same bus as the DALI controller 110.

Figure 2:
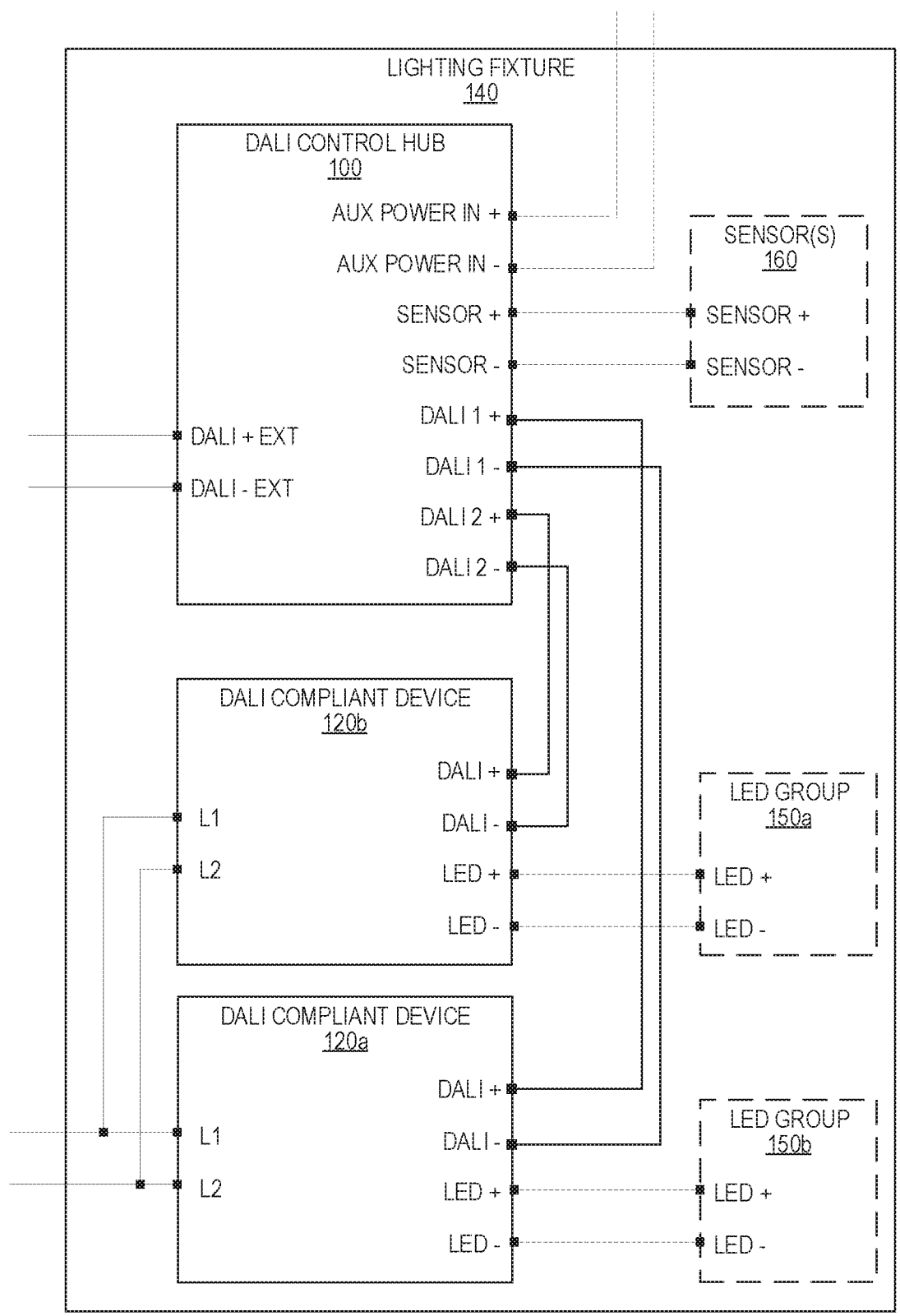
FIG. 2 is a wiring diagram illustrating an example of a light fixture, according to one or more examples of the present disclosure.

Consistent with the example of FIG. 1, FIG. 2 illustrates a wiring diagram of an example light fixture 140 according to one or more examples of the present disclosure. The light fixture 140 includes a DALI control hub 100 and a plurality of DALI compliant devices 120a, 120b. The DALI control hub 100 in this particular example communicates with each of the DALI compliant devices 120a, 120b via a respective 2-wire DALI bus (i.e., the wires of the first bus denoted at the DALI control hub 100 as DALI 1+/−, and the wires of the second bus denoted at the DALI control hub 100 as DALI 2+/−).

Although the example of FIG. 2 illustrates a DALI control hub 100 that supports two DALI compliant devices 120a, 120b and respective DALI buses, other examples include one or more additional DALI compliant devices 120. An additional DALI compliant device 120 may be communicatively connected to the DALI control hub 100 via a dedicated DALI bus or a DALI bus that is shared with one or more other DALI compliant devices 120.

Examples in which a DALI compliant device 120a, 120b is communicatively connected to the DALI control hub 100 via a dedicated DALI bus may be advantageous in one or more respects. For example, the DALI compliant devices 120a, 120b may not be required to coordinate addressing or share bus resources with each other, thereby potentially simplifying the design of each of the DALI compliant devices 120a, 120b. That said, examples in which a shared DALI bus is used may have its own advantages. For example, a shared DALI bus may simplify wiring and/or layout concerns.

The DALI control hub 100 also supports a DALI bus for communicating with a device that is external to the lighting fixture 140. In this example, the wires of the 2-wire DALI bus are denoted at the DALI control hub 100 as DALI+/−EXT. In particular, the DALI control hub 100 communicates with a DALI controller 110 over this interface.

The two wires of each DALI bus may be capable of carrying both power and data, the latter of which may be encoded over the DALI bus in Manchester code, for example. Although the DALI buses of FIG. 2 are each shown to be 2-wire buses, other bus technologies (e.g., Recommended Standard 485 (RS-485), Inter-Integrated Circuit ($I^2C$), Peripheral Component Interconnect (PCI)) for communicating between devices may be used according to other examples, any of which may include any number of wires, traces, or other signaling pathways.

In some examples, the DALI control hub 100 further includes auxiliary power circuitry configured to receive auxiliary power (e.g., from mains electricity, a battery, a power supply, not shown in FIG. 2). The DALI control hub 100 may use the auxiliary power as a redundant power source to mitigate the risk of power loss and/or deficit. The DALI control hub 100 may, in some examples, relay the auxiliary power to one or more of the other components of the lighting fixture 140 (e.g., to one or more of the DALI compliant devices 120a, 120b).

In some examples, the DALI control hub 100 further includes circuitry supporting communication with one or more sensors 160. Examples of such a sensor 160 may include an ambient light sensor and/or motion sensor. In particular, the DALI control hub 100 may send a control command to a DALI compliant device 120 in response to sensor input provided by one or more of the sensors 160. For example, DALI compliant device 120a and/or 120b may be an LED driver, and in response to a signal indicating that motion has been detected, the DALI control hub 100 may send a command to one or more of the LED drivers requesting that they drive power to one or more corresponding LED groups 150a, 150b of the lighting fixture 140 to which they are connected. In this regard, one or more of the DALI compliant devices 120a, 120b may, in some examples, be connected to one or more LED groups 150.

One or more of the DALI compliant devices 120a, 120b may include power circuitry configured to receive power (e.g., from mains electricity, a battery, a power supply, etc. not shown in FIG. 2). In this regard, any or all of the DALI compliant devices 120 may be wired to receive power from the same power source (which may be the same source or a different source than the source of auxiliary power discussed above with respect to the DALI control hub 100).

The DALI control hub 100 enables coordinated control over the DALI compliant devices 120a, 120b. In some examples, the DALI control hub 100 advantageously conceals the complexity of the DALI architecture within the lighting fixture 140 from the DALI controller 110. In this regard, the DALI control hub 100 may enable the DALI controller 110 to manage the lighting fixture 140 using relatively simple DALI commands, and take on the primary responsibility of orchestrating more sophisticated control over the DALI compliant devices 120a, 120b. Moreover, the DALI control hub 100 may avoid the need to use relatively expensive or sophisticated DALI compliant devices 120a, 120b in the lighting fixture 140. Indeed, in some examples, the DALI compliant devices 120a, 120b are entirely communicatively isolated from each other by the DALI control hub 100.

Figure 3:
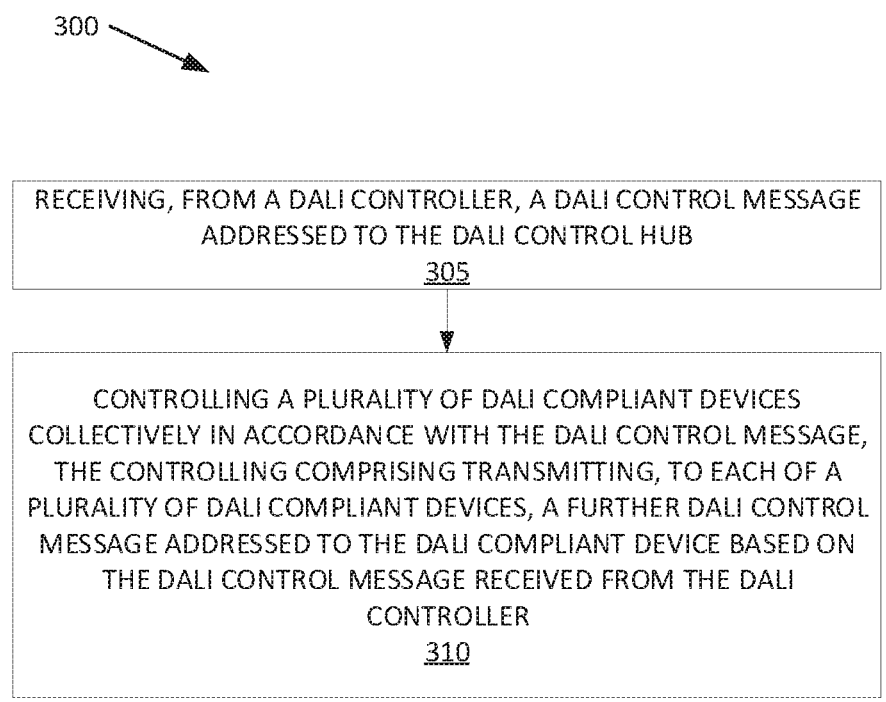
FIGS. 3 and 8 are flow diagrams illustrating example methods of DALI-based lighting control implemented by a DALI control hub, in accordance with particular examples of the present disclosure.

In view of the above, FIG. 3 is a flow diagram illustrating an example method 300 of DALI-based lighting control implemented by a DALI control hub 100, in accordance with particular examples of the present disclosure. The method 300 includes receiving, from a DALI controller 110, a DALI control message addressed to the DALI control hub 100 (block 305). The method 300 further includes controlling a plurality of DALI compliant devices collectively in accordance with the DALI control message, the controlling comprising transmitting, to each of a plurality of DALI compliant devices 120a, 120b, a further DALI control message addressed to the DALI compliant device 120a, 120b based on the DALI control message received from the DALI controller 110 (block 310).

More particularly, the DALI control hub 100 may enhance DALI-based lighting control between a DALI controller 110 and a plurality of DALI compliant devices 120 without the DALI controller 110 necessarily even being aware that the DALI compliant devices 120 exist. In this regard, the DALI control hub 100 may interact with the DALI compliant devices 120 in a variety of ways, depending on the example.

Figure 4:
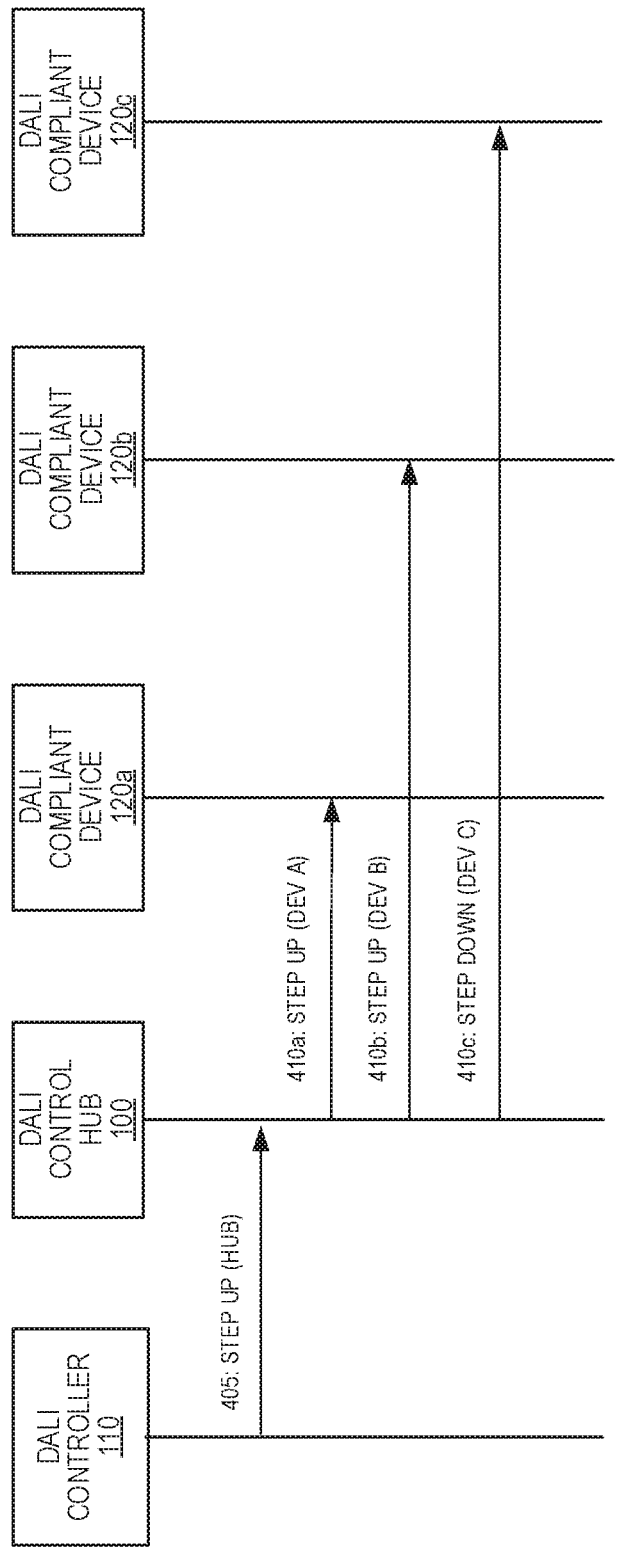
FIGS. 4, 6, and 7 are signaling diagrams illustrating DALI-based communication, according various examples of the present disclosure.

One such example of such communication between devices of the DALI network 130 is illustrated in the signaling diagram of FIG. 4. FIG. 4 illustrates certain DALI commands and responses consistent with examples of the present disclosure. According to this example, a DALI control hub 100 receives a control message requesting that illumination be stepped up (step 405). The control message is addressed to the DALI control hub 100. In response, the DALI control hub 100 transmits further control messages to a plurality of DALI compliant devices 120a-c (steps 410a-c). Each of the further control messages may include an appropriate control instruction and/or address configured to control the corresponding DALI compliant device 120a-c such that the DALI compliant devices 120a-c collectively behave in accordance with the control message from the DALI controller 100. In this regard, any or all of the further control messages sent to the DALI compliant devices 120a-c may be the same or different from each other, as may be necessary or appropriate to effectuate such a result.

Accordingly, in this particular example, the further control messages sent to DALI compliant devices 120a and 120b each include a control instruction requesting that illumination be stepped up (i.e., the same control instruction included in the control message from the DALI controller 100). In contrast, the further control message sent to DALI compliant device 120c includes a control instruction requesting that illumination be stepped down.

The example illustrated in FIG. 4 may be appropriate, for example, in an example in which the DALI compliant devices 120a-c are LED drivers that are configured with different step sizes and/or are configured to drive power to different LED groups 150 having different lighting characteristics. For example, the DALI compliant devices 120a-c may be configured to with illumination step sizes of ninety, twenty-five, and ten lumens, respectively. In such an example, different combinations of control commands may enable a lighting fixture 140 (or other lighting solution) to support a wider range of collective step sizes than those provided by the DALI compliant devices 120a-c individually.

Such an effect is illustrated in FIG. 5. FIG. 5 is a table illustrating an example of the potential effect of sending different combinations of DALI illumination stepping commands to DALI compliant devices 120a-c configured with step sizes of ninety, twenty-five, and ten lumens, respectively. As shown in FIG. 5, the DALI control hub 100 of this example would be capable of coordinating control over the DALI compliant devices 120a-c to support a wide variety of stepping levels, even if the stepping size of DALI compliant devices 120a-c individually are statically configured, and without having to implement any supporting capabilities at the DALI controller 100.

As applied to the example discussed above and illustrated in FIG. 4, stepping DALI compliant devices 120a and 120b up, and stepping DALI compliant device 120c down, would collectively step up the illumination of the light fixture by one hundred and five lumens.

Figure 6:
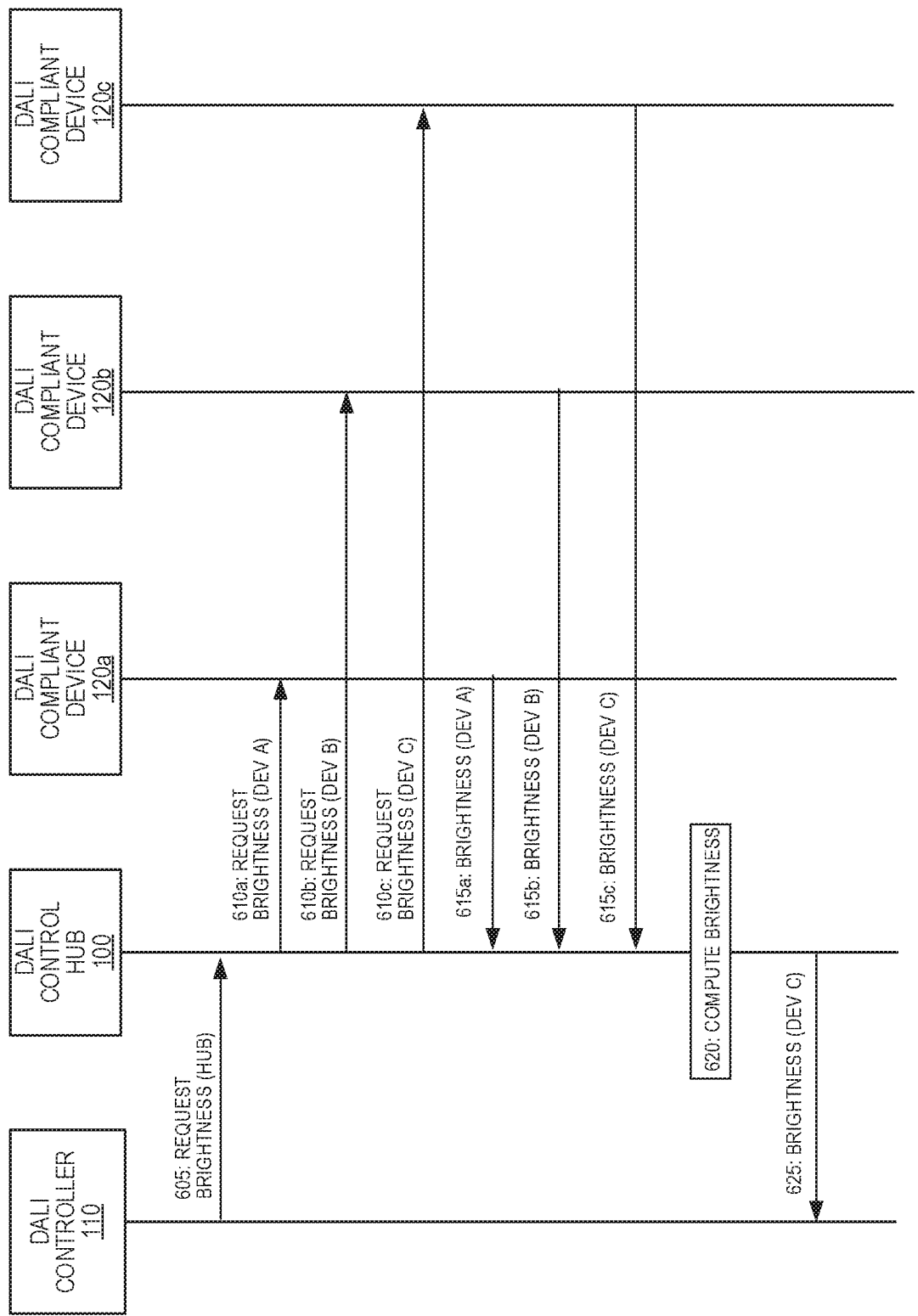

The DALI control hub 100 may, in some examples, additionally or alternatively respond to commands from the DALI controller 110 that query for certain information. The signaling diagram of FIG. 6 illustrates an example in which the DALI control hub 110 receives a control message from the DALI controller 110 that queries for brightness (step 605). The control message is addressed to the DALI control hub 100. In response, the DALI control hub 100 transmits further control messages to a plurality of DALI compliant devices 120a-c (steps 610a-c). Each of the further control messages is addressed to a respective DALI compliant device 120a-c, and requests a brightness thereof.

The DALI control hub 100 receives parametric information from the plurality of DALI compliant devices 120a-c in response to the further control messages (steps 615a-c). In particular, each of the DALI compliant devices 120a-c response with their own brightness level. For example, if each of the DALI compliant devices 110a-c is an LED driver, the brightness of each response may reflect the amount of power the LED driver is driving to a corresponding LED group 150 and/or an amount of lumens the corresponding LED group 150 currently providing.

In this example, the DALI control hub 100 computes a parameter that collectively represents the parametric information received from the DALI compliant devices 120a-c (step 620). In this particular example, the DALI control hub 100 computes an aggregate brightness parameter from the brightness parameters received from the DALI compliant devices 120a-c.

The computed parameter may be computationally combined in a variety of different ways, depending on the example. For example, the computed brightness may be simply a sum of the brightness parameters received from the DALI compliant devices 120a-c. Alternatively, the computed brightness may be an average of the brightness parameters (which may or may not be weighted, depending on the example). Other computational combinations may be appropriate, depending on the particular information requested, and the particular lighting solution involved. After the parameter representing the parametric information collectively has been computed, the DALI control hub 100 transmits this parameter to the DALI controller 110 in a response to the control message previously received therefrom (step 625).

Figure 7:
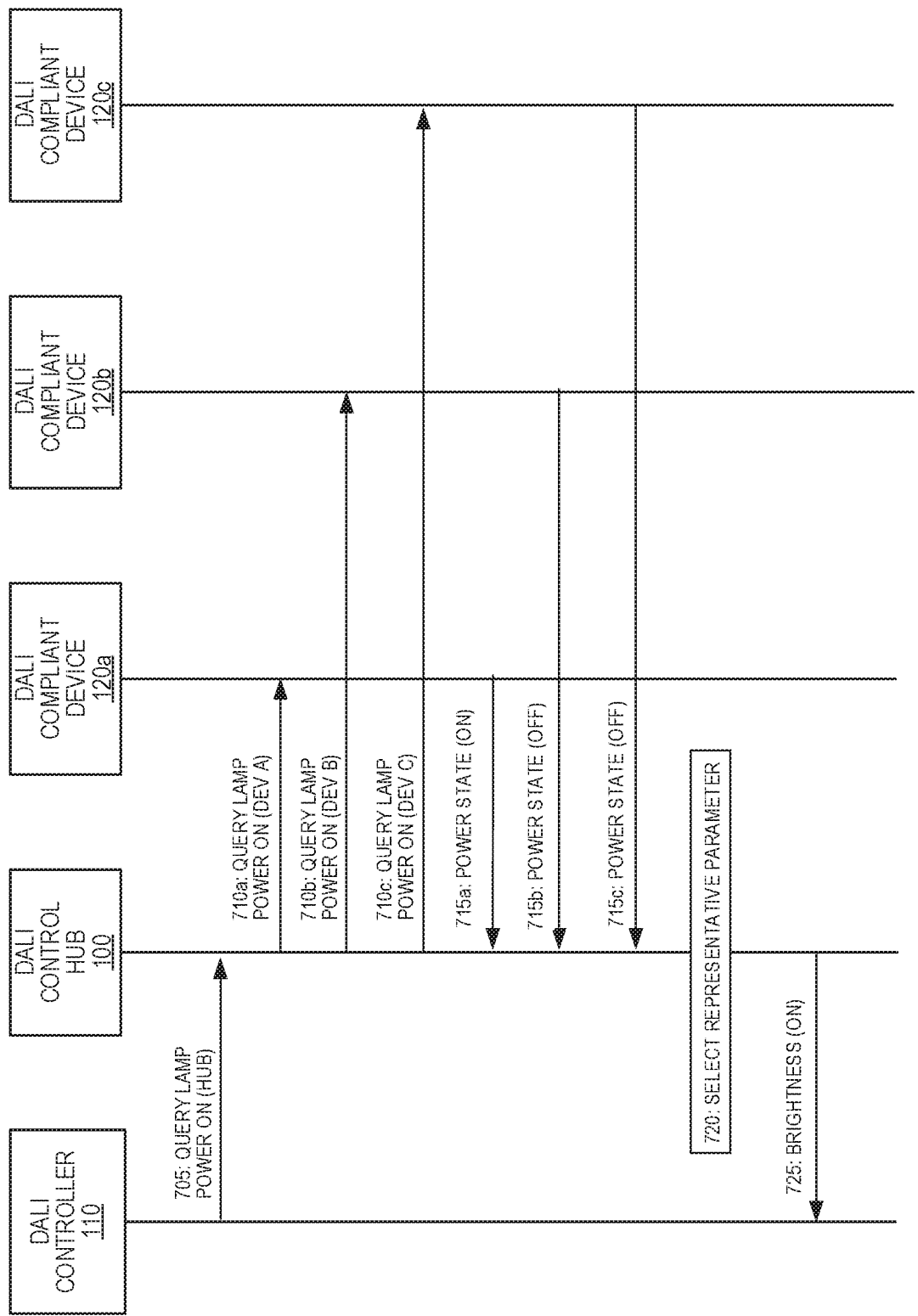

In some examples, the DALI control hub 100 may additionally or alternatively behave differently in response to a control command from the DALI controller 100. FIG. 7 illustrates an example in which the DALI controller 110 queries the DALI control hub 100 with regard to a lamp power on state (step 705). In response, the DALI control hub 100 sends further control messages to the DALI compliant devices 120a-c (steps 710a-c). The further control messages in this example are copies of the DALI control message received from the DALI controller, each being modified such that an address of the DALI control hub is replaced with an address of the corresponding DALI compliant device 120a-c to which the further control message is directed. In some such examples, the replacement of the address is the only modification of the DALI control message included in the further control messages.

The DALI compliant devices 120a-c respond with their parametric information indicating their respective lamp power on states (steps 715a-c). In this particular example, DALI compliant device 120a reports a power state of "ON," whereas DALI compliant devices 120b and 120c report a power state of "OFF."

The DALI control hub 100 selects a parameter representing the parametric information collectively from the parametric information received from the plurality of DALI compliant devices 120a-c (step 720), and includes the selected parameter without modification in a response to the DALI control message, which the DALI control hub 100 transmits to the DALI controller 110 (step 725). In this example, the DALI control hub 100 selects the "ON" response received from DALI compliant device 120a rather than either of the "OFF" responses received from the other DALI compliant devices 120b, 120c. In this regard, the DALI control hub 100 may select the "ON" response as being appropriate, for example, if the DALI compliant devices 120a-c are all included in the same lighting fixture 140, and the lighting fixture 140 would reasonably be considered to be on if any LED group 150 thereof is currently casting light. That said, other examples may include a DALI control hub 100 that selects whichever parameter received from the DALI compliant devices 120a-c occurs most frequently, or apply other decision criteria as appropriate in view of the particular query and lighting solution involved.

Figure 8:
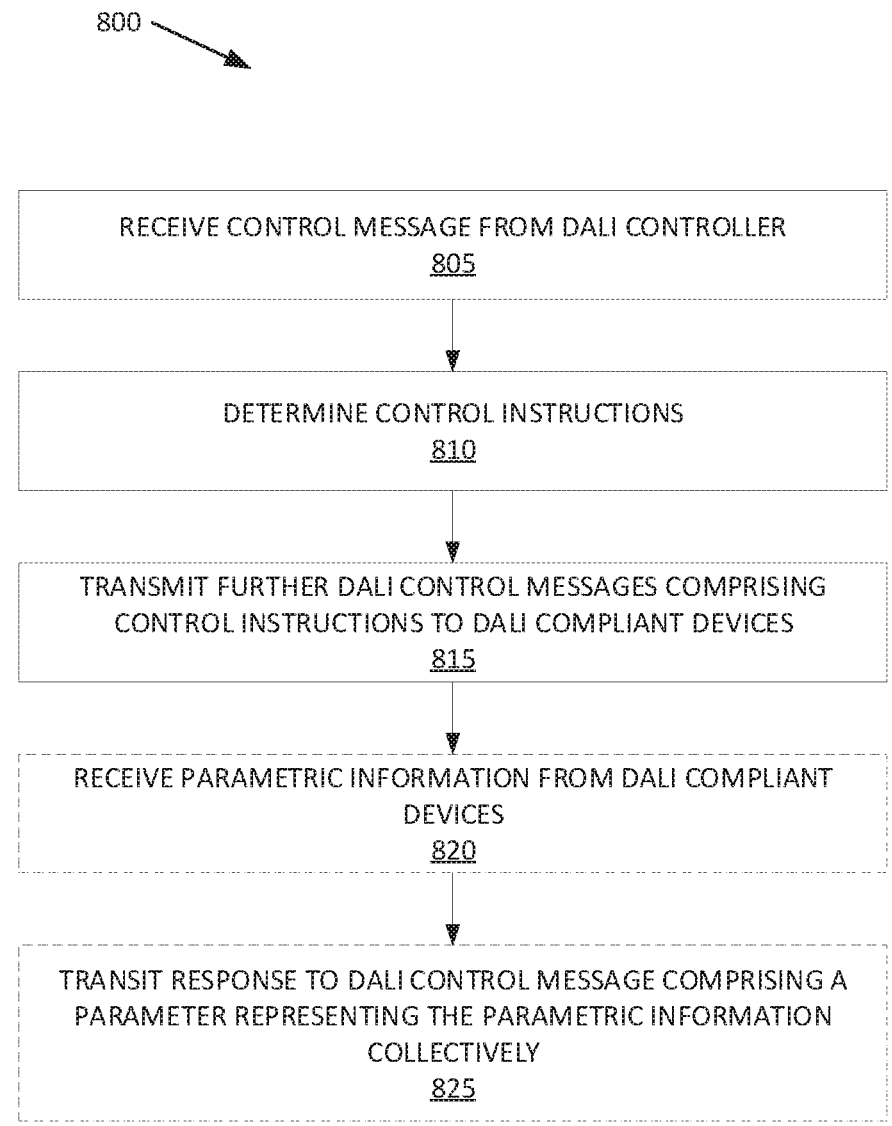

In view of all of the above, FIG. 8 is a flow diagram illustrating a further example method 800 implemented by a DALI control hub 100. The method 800 includes receiving a control message from a DALI controller (block 805). The control message may, for example, be a DALI control message addressed to the DALI control hub 100. That is, the DALI control message may include an address of the DALI control hub 100 on a DALI bus between the DALI control hub 100 and the DALI controller 110.

The method 800 further includes determining control instructions (block 810). In particular, the DALI control hub 100 may determine, for each of a plurality of further DALI control messages to be sent to respective DALI compliant devices 120, a control instruction to include in the further DALI control message such that the further DALI control messages collectively control the plurality of DALI compliant devices 120 to collectively behave in accordance with the DALI control message received from the DALI controller 110.

To do so, in some examples the control instructions are configured such that each of the further DALI control messages is configured to control a respective DALI compliant device differently. In some examples, the further DALI control messages are copies of the DALI control message received from the DALI controller 110, modified only such that an address of the DALI control hub 110 is replaced with an address of the DALI compliant device 120 to which each is directed. Accordingly, the control instructions may be the same as that found in the in the control message from the DALI controller 110 in some examples.

In some examples, each of the control instructions are configured to adjust a lighting parameter of the DALI compliant device to which it is directed to a corresponding extent. For example, as discussed above, the DALI control message received from the DALI controller 110 may indicate an extent by which to adjust a lighting parameter, and the DALI control hub 100 includes the control instructions in further DALI control messages such that the further DALI control messages are configured to adjust the lighting parameter in the DALI compliant devices 120, on average, by the extent indicated.

The method 800 further includes transmitting, to each of the plurality of DALI compliant devices 120, a further DALI control message addressed to the DALI compliant device 120 based on the DALI control message received from the DALI controller 110 (block 815). In some such examples, one or more of the DALI compliant devices 120 may be a DALI compliant electronic driver.

The method 800 may further include receiving parametric information from the plurality of DALI compliant devices (block 820), and transmitting, to the DALI controller, a response to the DALI control message (block 825). The response includes a parameter representing the parametric information collectively.

In some such examples, the DALI control hub 100 selects the parameter representing the parametric information collectively from the parametric information received from the plurality of DALI compliant devices 120, and includes the parameter without modification in the response to the DALI control message. In other examples, the DALI control hub 100 generates the parameter representing the parametric information collectively. To do so, the DALI control hub 100 computationally combines the parametric information received from the plurality of DALI compliant devices. The DALI control hub 100 then includes the parameter in the response to the DALI control message.

Figure 9:
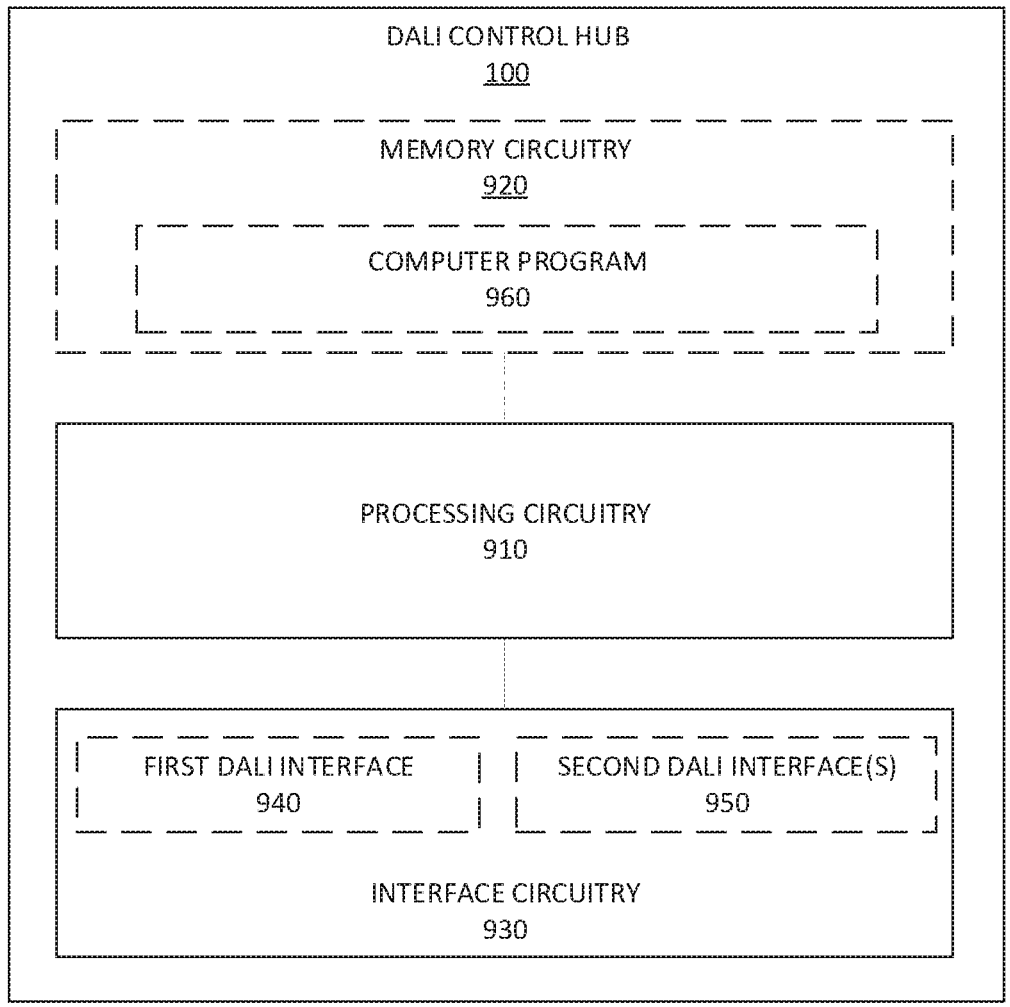
FIG. 9 is a schematic block diagram illustrating an example DALI controller, according to one or more examples of the present disclosure.

FIG. 9 is a schematic block diagram illustrating a DALI control hub 100 according to one or more examples. The DALI control hub 100 includes interface circuitry 930 and processing circuitry 910 that is communicatively coupled to the interface circuitry 930, e.g., via one or more buses. The interface circuitry 930 is configured to exchange signals with a DALI controller 110 and one or more DALI compliant devices 120. In some examples, the DALI control hub 100 further includes memory circuitry 920 communicatively coupled to the processing circuitry 910.

The interface circuitry 930 may be a controller hub configured to control the input and output (I/O) data paths of the DALI control hub 100. Such I/O data paths may include data paths for exchanging signals over one or more DALI buses and/or one or more other network interfaces. For example, the interface circuitry 930 may include a transceiver configured to send and receive communication signals over one or more of such interfaces.

The interface circuitry 930 may be implemented as a unitary physical component, or as a plurality of physical components that are contiguously or separately arranged, any of which may be communicatively coupled to any other, or may communicate with any other via the processing circuitry 910. For example, the interface circuitry 930 may include a first DALI interface 940 and one or more second DALI interfaces 750. The first DALI interface 940 may be configured to communicate with a DALI controller 110. Each second DALI interface 950 may be configured to communicate with one or more DALI compliant devices 120. In some particular examples, each second DALI interface 950 may be configured to communicate with a respective DALI compliant device 120.

The processing circuitry 910 may include one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 910 may be programmable hardware capable of executing software instructions stored, e.g., as a machine-readable computer program 960 in the memory circuitry 920. The memory circuitry 920 of the various examples may include any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The processing circuitry 910 is configured to perform one or more of the processing aspects recited herein. For example, the processing circuitry 910 may exchange information with the interface circuitry 930, e.g., in order to perform one or more steps of the method 300 and/or the method 800 discussed above.

In some examples, the processing circuitry 910 is configured to receive, from the DALI controller 110 via the first DALI interface 940, a DALI control message addressed to the DALI control hub 100. The processing circuitry 910 is further configured to control a plurality of DALI compliant devices collectively in accordance with the DALI control message. To control the plurality of DALI compliant devices collectively, the processing circuitry 910 is configured to transmit, to each of the plurality of DALI compliant devices 120 via a respective one of the second DALI interfaces 950, a further DALI control message addressed to the DALI compliant device 120 based on the DALI control message received from the DALI controller 110.

Examples herein further include a computer program 960 including software instructions that, when executed on processing circuitry 910 of a DALI control hub 100, cause the DALI control hub 100 to carry out any of the respective processing described above. A computer program 960 in this regard may include one or more code modules, each of which may correspond to one or more of the steps of any of the methods 300, 800 described above.

Examples further include a carrier containing such a computer program. This carrier may include one of an electronic signal, optical signal, radio signal, or computer readable storage medium.

The present invention may, of course, be carried out in other ways than those specifically set forth herein without departing from essential characteristics of the invention. The present examples are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A Digital Addressable Lighting Interface (DALI) control hub comprising:
   a first DALI interface configured to communicate with a DALI controller;
   a plurality of second DALI interfaces respectively configured to communicate with a plurality of DALI compliant devices;
   processing circuitry communicatively coupled to the first DALI interface and each of the second DALI interfaces, wherein the processing circuitry is configured to:
      receive, from the DALI controller via the first DALI interface, a DALI control message addressed to the DALI control hub;
      control the plurality of DALI compliant devices collectively in accordance with the DALI control message;
      wherein to control the plurality of DALI compliant devices collectively, the processing circuitry is configured to transmit, to each of the plurality of DALI compliant devices via a respective one of the second DALI interfaces, a further DALI control message addressed to the DALI compliant device based on the DALI control message received from the DALI controller.

2. The DALI control hub of claim 1, wherein to transmit to each of the plurality of DALI compliant devices, the processing circuitry is configured to transmit to each of a plurality of DALI compliant electronic drivers.

3. The DALI control hub of claim 1, wherein to transmit the further DALI control messages, the processing circuitry is configured to transmit, to each of the plurality of DALI compliant devices, a copy of the DALI control message received from the DALI controller modified such that an address of the DALI control hub is replaced with an address of the DALI compliant device.

4. The DALI control hub of claim 1, wherein the processing circuitry is further configured to determine, for each of the further DALI control messages, a control instruction to include in the further DALI control message such that the further DALI control messages collectively control the plurality of DALI compliant devices to collectively behave in accordance with the DALI control message received from the DALI controller.

5. The DALI control hub of claim 4, wherein the processing circuitry is further configured to include the control instructions in the further DALI control messages such that each of the further DALI control messages is configured to control a respective DALI compliant device differently.

6. The DALI control hub of claim 5, wherein to include the control instructions in the further DALI control messages such that each of the further DALI control messages is configured to control the respective DALI compliant device differently, the processing circuitry is configured to include in each of the further DALI control messages a control instruction configured to adjust a lighting parameter of the DALI compliant device to a corresponding extent.

7. The DALI control hub of claim 4, wherein:
   the DALI control message received from the DALI controller indicates an extent by which to adjust a lighting parameter;
   the processing circuitry is further configured to include the control instructions in the further DALI control messages such that the further DALI control messages are configured to adjust the lighting parameter in the DALI compliant devices, on average, by the extent indicated.

8. The DALI control hub of claim 1, wherein the processing circuitry is further configured to:
   receive, via the plurality of second DALI interfaces, parametric information from the plurality of DALI compliant devices; and
   transmit, to the DALI controller via the first DALI interface, a response to the DALI control message, the response comprising a parameter representing the parametric information collectively.

9. The DALI control hub of claim 8, wherein the processing circuitry is further configured to select the parameter representing the parametric information collectively from the parametric information received from the plurality of DALI compliant devices, and include the parameter without modification in the response to the DALI control message.

10. The DALI control hub of claim 8, wherein the processing circuitry is further configured to:
    generate the parameter representing the parametric information collectively, wherein to generate the parameter the processing circuitry is configured to computationally combine the parametric information received from the plurality of DALI compliant devices; and
    include the parameter in the response to the DALI control message.

11. A method of Digital Addressable Lighting Interface (DALI)-based lighting control, implemented by a DALI control hub, the method comprising:
    receiving, from a DALI controller, a DALI control message addressed to the DALI control hub; and controlling a plurality of DALI compliant devices collectively in accordance with the DALI control message, the controlling comprising transmitting, to each of the DALI compliant devices, a further DALI control message addressed to the DALI compliant device based on the DALI control message received from the DALI controller.

12. The method of claim 11, wherein transmitting to each of the plurality of DALI compliant devices comprises transmitting to each of a plurality of DALI compliant electronic drivers.

13. The method of claim 11, wherein transmitting the further DALI control messages comprises transmitting, to each of the plurality of DALI compliant devices, a copy of the DALI control message received from the DALI controller modified such that an address of the DALI control hub is replaced with an address of the DALI compliant device.

14. The method of claim 11, further comprising determining, for each of the further DALI control messages, a control instruction to include in the further DALI control message such that the further DALI control messages collectively control the plurality of DALI compliant devices to collectively behave in accordance with the DALI control message received from the DALI controller.

15. The method of claim 14, further comprising including the control instructions in the further DALI control messages such that each of the further DALI control messages is configured to control a respective DALI compliant device differently.

16. The method of claim 15, wherein including the control instructions in the further DALI control messages such that each of the further DALI control messages is configured to control the respective DALI compliant device differently comprises including in each of the further DALI control messages a control instruction configured to adjust a lighting parameter of the DALI compliant device to a corresponding extent.

17. The method of claim 14, wherein:
the DALI control message received from the DALI controller indicates an extent by which to adjust a lighting parameter;
the method further comprises including the control instructions in the further DALI control messages such that the further DALI control messages are configured to adjust the lighting parameter in the DALI compliant devices, on average, by the extent indicated.

18. The method of claim 11, further comprising:
receiving parametric information from the plurality of DALI compliant devices; and
transmitting, to the DALI controller, a response to the DALI control message, the response comprising a parameter representing the parametric information collectively.

19. The method of claim 18, further comprising selecting the parameter representing the parametric information collectively from the parametric information received from the plurality of DALI compliant devices, and including the parameter without modification in the response to the DALI control message.

20. The method of claim 18, further comprising:
generating the parameter representing the parametric information collectively, the generating comprising computationally combining the parametric information received from the plurality of DALI compliant devices; and
including the parameter in the response to the DALI control message.

21. The method of claim 11, wherein:
receiving the DALI control message from the DALI controller comprises receiving the DALI control message via a first DALI interface of the DALI control hub;
transmitting, to each of the plurality of DALI compliant devices, the further DALI control message comprises transmitting each further DALI control message via a respective second DALI interface of the DALI control hub.

22. A non-transitory computer readable medium storing a computer program for controlling a programmable Digital Addressable Lighting Interface (DALI) control hub, the computer program comprising software instructions that, when run on processing circuitry of the programmable DALI control hub, cause the programmable DALI control hub to:
receive, from a DALI controller, a DALI control message addressed to the DALI control hub; and
control a plurality of DALI compliant devices collectively in accordance with the DALI control message, wherein to control the plurality of DALI compliant devices, the programmable DALI control hub is caused to transmit, to each of the plurality of DALI compliant devices, a further DALI control message addressed to the DALI compliant device based on the DALI control message received from the DALI controller.

* * * * *